United States Patent
Meir et al.

(10) Patent No.: US 9,489,777 B2
(45) Date of Patent: Nov. 8, 2016

(54) DEVICE FOR DETECTING THE IMPACT OF AN OBJECT ON A VEHICLE

(71) Applicant: Bayerische Motoren Werke Aktiengesellschaft, Munich (DE)

(72) Inventors: Frank Meir, Weilheim (DE); Lutz Eisenmann, Vierkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/220,379

(22) Filed: Mar. 20, 2014

(65) Prior Publication Data

US 2014/0207330 A1     Jul. 24, 2014

Related U.S. Application Data

(63) Continuation of application No. PCT/EP2012/067419, filed on Sep. 6, 2012.

(30) Foreign Application Priority Data

Sep. 20, 2011   (DE) .................. 10 2011 083 027

(51) Int. Cl.
  *B60R 19/02*   (2006.01)
  *B60R 21/34*   (2011.01)
  *B60R 21/0136*   (2006.01)
  (Continued)

(52) U.S. Cl.
  CPC ............. *G07C 5/00* (2013.01); *B60R 21/0136* (2013.01); *B60R 21/36* (2013.01); *G01L 27/007* (2013.01)

(58) Field of Classification Search
  None
  See application file for complete search history.

(56) References Cited

U.S. PATENT DOCUMENTS 6,725,961 B2 *  4/2004  Mattes ............... B60R 21/0136
                                                    180/274
6,885,966 B1 *  4/2005  Tyroller ............. B60R 21/0136
                                                    340/436

(Continued)

FOREIGN PATENT DOCUMENTS

DE     101 14 465 A1    9/2002
DE     101 37 250 A1    2/2003

(Continued)

OTHER PUBLICATIONS

International Search Report with English translation dated Jun. 24, 2013 (Four (4) pages).

(Continued)

*Primary Examiner* — Jerrah Edwards
*Assistant Examiner* — Demetra Smith-Stewart
(74) *Attorney, Agent, or Firm* — Crowell & Moring LLP

(57) ABSTRACT

The invention relates to a device for detecting the impact of an object on a vehicle, which comprises a hose filled with a filling medium. The device also comprises a first pressure sensor which is connected with a first end of the hose and a second pressure sensor connected with a second end of the hose. An electronic control unit is connected with the first and the second pressure sensor and is designed for the processing of the signals received by the first and the second pressure sensor. The hose is sealed off with respect to the environment and the first and the second pressure sensor, so that the internal pressure of the filling medium is independent of an ambient pressure. The electronic control unit is designed for processing temperature-caused changes of the internal pressure as a criterion for the diagnosis of the operability of the device.

16 Claims, 1 Drawing Sheet

(51) Int. Cl.
*G07C 5/00* (2006.01)
*G01L 27/00* (2006.01)
*B60R 21/36* (2011.01)

(56) References Cited

U.S. PATENT DOCUMENTS

| | | | | |
|---|---|---|---|---|
| 7,331,415 | B2* | 2/2008 | Hawes | B60R 21/0136 180/274 |
| 8,015,029 | B2* | 9/2011 | Flood | G06F 19/322 705/2 |
| 8,128,140 | B2* | 3/2012 | Tanabe | B60R 21/0136 293/117 |
| 8,862,312 | B2* | 10/2014 | Nehls | B60R 21/0136 340/436 |
| 2012/0136592 | A1* | 5/2012 | Pereira et al. | 702/50 |

FOREIGN PATENT DOCUMENTS

| | | | | |
|---|---|---|---|---|
| DE | 102 32 523 A1 | | 1/2004 | |
| DE | 10 2004 031 577 A1 | | 2/2006 | |
| DE | 10 2004 034 877 A1 | | 2/2006 | |
| DE | 102004031575 A1 | * | 2/2006 | |
| DE | 10 2006 053 962 A1 | | 5/2007 | |
| DE | 10 2008 021 611 A1 | | 1/2009 | |
| DE | 10 2007 044 814 A1 | | 4/2009 | |
| DE | 10 2010 018 400 A1 | | 10/2010 | |
| DE | 102010018400 A1 | * | 10/2010 | |
| DE | 102009048067 A1 | * | 4/2011 | |
| DE | 102010053312 A1 | * | 7/2011 | |
| DE | 102011011962 A1 | * | 8/2012 | |
| DE | 10114465 B4 | * | 12/2012 | |
| DE | 102011116755 A1 | * | 4/2013 | B60R 21/0136 |
| EP | 0937612 A2 | * | 8/1999 | |
| EP | 1 870 688 A1 | | 12/2007 | |
| FR | WO 2004058545 A1 | * | 7/2004 | B60R 19/483 |
| JP | 2007-183100 A | | 7/2007 | |
| JP | 2009-18732 A | | 1/2009 | |

OTHER PUBLICATIONS

German Search Report dated Jan. 4, 2012 with Statement of Relevancy (Six (6) pages).
International Preliminary Report on Patentability dated Mar. 25, 2014 (Six (6) pages).
German-language Japanese Office Action issued in counterpart Japanese Application No. 2014-531166 dated May 24, 2016 (7 pages).

* cited by examiner

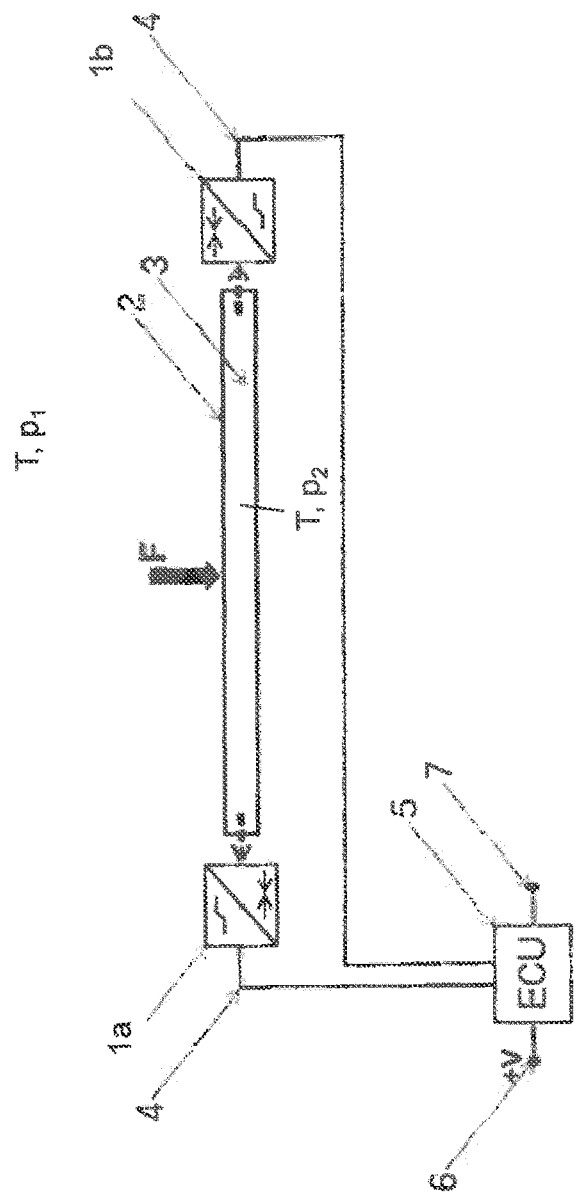

DEVICE FOR DETECTING THE IMPACT OF AN OBJECT ON A VEHICLE

CROSS REFERENCE TO RELATED APPLICATIONS

This application is a continuation of PCT International Application No. PCT/EP2012/067419, filed Sep. 6, 2012, which claims priority under 35 U.S.C. §119 from German Patent Application No. 10 2011 083 027.8, filed Sep. 20, 2011, the entire disclosures of which are herein expressly incorporated by reference.

BACKGROUND AND SUMMARY OF THE INVENTION

The invention relates to a device and a method for detecting the impact of an object on a vehicle. The device comprises a hose filled with a filling medium, which hose has a first end and a second end situated opposite the first end. A first pressure sensor is connected with the first end of the hose, and a second pressure sensor is connected with the second end of the hose, where the first and the second pressure sensor each providing a signal representing the pressure of the filling medium. The device further has an electronic control unit which is connected by way of connection lines with the first and the second sensor for the exchange of data, the electronic control unit being designed for the processing of the signals received by the first and the second pressure sensor.

Such a device is installed particularly in pedestrian protection systems in the front bumper of a vehicle. The device consists of two electric pressure sensors which are tightly connected with one another by means of a highly flexible hose, for example, made of rubber, caoutchouc or Latex. The hose is normally filled with air, in which case the pressure prevailing in the interior of the hose corresponds to the ambient pressure as a result of a pressure compensation element provided in the hose. As a rule, the pressure compensation element consists of a membrane through which the air can penetrate in both directions. However, the membrane is designed such that no water and no dirt can penetrate into the interior of the hose. An adaptation of the pressure prevailing in the interior of the hose to the ambient pressure takes place within seconds, for example, when driving over a mountain pass or in the case of large temperature fluctuations. The pressure sensors are electrically connected by way of connection lines to an electronic control unit (ECU). Usually, but not always, the signal transmission from the pressure sensors to the electronic control unit takes place by way of the connection lines. In the same manner, the pressure sensors are also supplied with the voltage required for their operation by way of the connection lines.

An external force effect on the hose results in a pressure change of the pressure prevailing in the interior of the hose (interior pressure). The pressure change is recorded by the two pressure sensors. Depending on the location at which the pressure admission or external force effect takes place, the sensing of the pressure change at the two pressure sensors can take place in a staggered manner. The analysis of the pressure change takes place in the electronic control unit or, as an alternative, in an analyzing unit connected on the output side of the electronic control unit. In particular, in this case, the time curve of the pressure change is analyzed. As a function of the results of the analysis, a decision takes place concerning the triggering of suitable protective measures. In the case of a pedestrian protection system, the protective measures could consist of lifting the engine hood of the vehicle, so that, after an impact of a person's head and/or body, a longer deformation path is available for the reduction of energy. The protective measures may also comprise a window airbag (pedestrian protection airbag). The person's injuries may thereby be alleviated.

The pressure sensors used in the above-described device may be derivatives of conventional pressure sensors, as used, for example, in the doors of a vehicle for recognizing a side impact. Such sensors are based on detecting a changed pressure. This means that each measurement determines the pressure difference with respect to the last measured value. As a result, a pressure curve is thereby analyzed. Such sensors are diagnosable. This means that it can be determined by the electronic control unit or the analyzing unit connected on the output side whether a respective pressure sensor is operational per se.

The linking of the hose to the pressure sensors usually takes place in that the hose ends are fitted over corresponding connection pieces of the pressure sensors. A mechanical fixing can take place by way of clamps (other fixing methods are also conceivable). Over time, the hose may become brittle or porous, for example, as a result of temperature influences or friction points. Likewise, tears of the hose cannot be excluded. Also, during the operation of the device, even when a new part is installed, it cannot be ensured that the hose and the linkage of the hose to the pressure sensors are tight. However, the operability of the device for detecting the impact of an object can therefore no longer be reliably ensured.

Leakage points have the result that a pressure change of the air in the interior of the hose resulting from an external force effect, e.g., the impact of an object, cannot be recognized or cannot be sufficiently recognized. This has a direct effect on the algorithm used for detecting an impact and therefore on the decision concerning the triggering of a protective measure. In the worst case, such as a torn hose or an opened-up hose linkage at one of the pressure sensors, under certain circumstances a pressure change may even no longer be detectable at any of the two pressure sensors, so that no protective measures are triggered when a pedestrian impacts on the vehicle.

So far, no diagnosis with respect to the operability of the hose has been possible. It is therefore also not possible to determine whether the signals supplied by the two pressure sensors are plausible, because it cannot be ensured in principle that the device as a whole is operable. For this reason, such devices are designed such that the triggering of the protection device can already take place on the basis of a signal transmitted by one pressure sensor.

It is therefore an object of the present invention to indicate a device and a method for detecting the impact of an object on a vehicle, which permit the diagnosability of the entire device.

These objects are achieved by a device according to the characteristics set forth in the independent claims hereof. Advantageous further developments are indicated in the dependent claims.

The invention provides a device for detecting the impact of an object on the vehicle. The device comprises a hose filled with a filling medium, which hose has a first end and a second end situated opposite the first end. A first pressure sensor is connected with the first end of the hose. A second pressure sensor is connected with the second end of the hose. The first and the second pressure sensor each provide a signal representing the pressure of the filling medium. The device further comprises an electronic control unit which is connected by way of connection lines with the first and the second sensor for the exchange of data, the electronic control unit being designed for the processing of the signals received by the first and the second pressure sensor.

According to the invention, the hose is sealed off with respect to the environment and the first and the second pressure sensor, so that the internal pressure of the filling medium prevailing in the hose is independent of an ambient pressure and thereby dependent on a temperature fluctuation. The electronic control unit is designed for processing temperature-caused changes of the internal pressure during the operation of the vehicle as a criterion for the diagnosis of the operability of the device.

As a result of the fact that the hose is sealed off with respect to the environment and the first and the second pressure sensors, the internal pressure of the hose is uncoupled from the ambient air pressure. Temperature fluctuations, which influence the internal-pressure, occur with each drive of the vehicle. These slow pressure changes are used as a criterion for a diagnosis of the operability of the hose. When, in the reverse case, no pressure change takes place in the driving operation, i.e. a respective drive or a respective driving cycle, it can be concluded that there is a leaky hose or leaky linkage of the hose to at least one of the two pressure sensors. It thereby becomes possible to not only diagnose the pressure sensors with respect to their operability, but it now becomes possible to, for the first time, also check the hose indirectly with respect to its operability during the operation of the motor vehicle.

A sealing-off of the sensors with respect to the environment is achieved in that the sensors comprise no pressure compensation element. Likewise, it is provided that the first and the second pressure sensor comprise no ventilation openings or possibly existing ventilation openings of the pressure sensors are sealed off in an airtight manner. Ventilation openings of the pressure sensors, if present, have the purpose of providing a redundant pressure compensation with respect to a pressure compensation element. This is particularly necessary when the pressure compensation element is arranged in the bumper of the vehicle such that it may become soiled and can therefore no longer carry out its function.

It may further be provided that the diagnosis of the operability of the device comprises a processing of the internal pressure for at least several minutes and/or one driving cycle. A time period of several minutes may be required for generating a temperature-caused pressure fluctuation of the internal pressure. As an alternative or in addition, the diagnosis of the hose can also be carried out permanently in a driving operation between the switching-on and switching-off of the ignition. This driving operation will then represent a driving cycle. Optionally, there is also the possibility of carrying out the monitoring during stationary periods and, for example, evaluate day/night temperature differences.

The electronic control unit is optionally designed for evaluating the pressure curve of the internal pressure for diagnosing the operability of the device. It may be determined that a device is functional when, within a preset time period since the starting point in time, a preset pressure change is determined in the pressure curve. Likewise, a pressure change can be detected by changed air pressure and by a changing of the vehicle height with respect to sea level, i.e. when driving over mountain passes.

The electronic control unit may also be designed for determining, for the diagnosis of the operability of the device, a pressure difference of the internal pressure between a starting point in time and a measuring point in time, an operable device being assumed when the pressure difference exceeds a predefined threshold value for a preset time period and/or a driving cycle. In this case, the exceeding of a few millibars of pressure difference is sufficient as a threshold value in order to draw a conclusion on the operability of the hose and the connections of the hose to the pressure sensors.

The time period described in the first-mentioned embodiment and the time difference between the measuring point in time and the starting point in time may basically be the same. In principle, they may also be selected to differ.

It is further advantageous for the device to be placed in the bumper of the vehicle adjacent to a heat source of the vehicle in order to, during the operation of the vehicle, particularly after a start of the vehicle, within a predefined time period, generate a temperature-caused internal-pressure change of the filling medium in the hose. The placing of the device adjacent to a heat source, for example a heat exchanger or the engine itself, permits a faster diagnosis of the operability of the hose because the temperature rise will be relatively high within a short time. If a spatial arrangement directly adjacent to a heat-radiating component is not possible, it may optionally be provided to cause air, which is heated by the components generating waste heat, to flow onto the device.

It is sufficient for the pressure sensors to have a measuring range of more than ±20 mbar, particularly more than ±50 mbar and most preferably of ±100 mbar. This enlarged measuring range also makes it possible to detect only slight temperature-caused pressure differences. This is necessary, for example, when the temperature-caused pressure changes are caused only as a result of a change of the ambient temperature.

It is further provided that the measuring range is selected as a function of the volume and type of filling medium provided in the hose. The dynamics of the measuring range of the pressure sensors can thereby be taken into account.

In principle, it is conceivable to use the pressure sensors from known pedestrian protection systems in a device according to the invention. The initially described pressure sensors, which detect a changed pressure, can, for example, be used.

The device according to the invention has the advantage that, as a result of the elimination of pressure compensation elements and the use of pressure sensors which comprise no ventilation openings, it can be provided more cost-efficiently than the known devices.

Furthermore, high-expenditure mounting devices can be eliminated when the device is integrated in the bumper. Such mounting devices are normally used for protecting the hose from damage, so that no tears or damages will occur during the operation of the vehicle. This is necessary because up to now no diagnosis of the operability of the hose could be carried out.

As a result of the fact that now, in addition of the pressure sensors, the hose and its linkage to the pressure sensors can be diagnosed, it becomes possible to check the plausibility of the signals supplied by the two pressure sensors with respect to one another. Ensuring the plausibility may, for example, consist of triggering a protection device only when both pressure sensors supply a signal. An increased operational reliability can thereby be provided. As an alternative, an implementation may consist of the fact that a triggering of the protection device already takes place when a signal of a single pressure sensor is present. The signal of the second pressure sensor is supplied to the electronic control unit only for redundancy purposes. The functional reliability of the device can thereby be improved. In particular, this will result in fewer false triggerings.

The invention further provides a method for checking a device for detecting the impact of an object on a vehicle, the device being designed as described above. For diagnosing the operability of the device, in the case of this method, a temperature-caused change of the internal pressure during the operation of the vehicle is processed as a criterion for the diagnosis of the operability of the device.

As an alternative or in addition, pressure changes which result from a height difference during the vehicle operation, can be processed as criteria for the diagnosis of the operability of the device.

The hose and/or its linkage to the first and/or second pressure sensor is determined to be operable when, within a predefined time period and/or a driving cycle since the starting point in time, (i) a predefined pressure change in the pressure curve is determined, (ii) a pressure difference of the internal pressure between a starting point in time and a measuring time point in time exceeds a predefined threshold value, or (iii) when the signals differ that are supplied by the pressure sensors.

The method according to the invention has the same advantages that were described in connection with the device according to the invention.

The invention and its advantages will be described in detail in the following by means of an embodiment in the drawing. The single FIGURE is a schematic view of a device according to the invention for detecting the impact of an object on a vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic view of a device according to the invention for detecting the impact of an object on the vehicle.

DETAILED DESCRIPTION OF THE DRAWINGS

The device represents the sensors of a pedestrian protection system. It comprises two electric pressure sensors 1a, 1b which are connected with one another by means of a hose 2. The hose consists of a material that has a high flexibility in the case of an external force effect F acting upon the hose. The hose may, for example, consist of rubber, caoutchouc or Latex. All three materials have high flexibility in response to an external force effect F upon the hose 2. By way of respective connection lines 4, the pressure sensors 1a, 1b are connected with an electronic control unit 5. The connection lines are preferably designed as a bus system (PS15, LIN, CAN, etc.), so that, in addition to the exchange of data, a voltage supply of the sensors 1a, 1b can also take place by the electronic control unit 5.

In a known manner, the device illustrated in FIG. 1 can be arranged in the bumper of a motor vehicle along its entire width. An external force effect F upon the hose 2 results in a pressure change of the internal pressure p2 of the filling medium, such as air or a gas. The pressure change is recorded by both pressure sensors 1a, 1b. The recording of the pressure change can take place in a time-staggered manner depending on the position of the force effect by the two pressure sensors. The pressure change is a function of the speed of the vehicle, the weight of the impacting object as well as the outside temperature. An adult will, for example, cause a greater pressure change than a child impacting on the device or even a ball. From the amount of the pressure change, a conclusion can, for example, be drawn concerning the type of the impacting object. As a function thereof, suitable protective measures can be triggered.

The pressure sensors may, for example, be derived from conventional pressure sensors which are used in vehicles for the crash detection in doors. In the case of such pressure sensors, the sensors themselves have diagnosability. The pressure sensors can therefore be examined in an automated manner concerning their mechanical and electric functioning ability with respect to the pressure detection and transmission of a signal representing the pressure to the electronic control unit.

The device is preferably designed such that, at the lowest specified operating temperature, the hose does not contract or constrict because of the low air volume. This has the result that excess pressure may prevail in the hose at a normal temperature.

In contrast to the devices used in the prior art, the sensors 1a, 1b have no pressure compensation element. Likewise, the pressure sensors 1a, 1b have no ventilation openings. Possibly existing ventilation openings of the pressure sensors are closed off in an airtight manner. The internal pressure p2 is thereby uncoupled from the ambient air pressure p1. As a result, there is a dependence of the internal pressure p2 on the temperature T. An operability of the entire device can then be inferred if, during the operation of the motor vehicle, temperature-caused changes of the internal pressure are acquired and detected by the pressure sensors. The temperature-caused changes of the internal pressure are processed during the operation of the vehicle as a criterion for the diagnosis of the operability of the device.

In order to be able to determine a temperature-caused pressure change, the measuring is carried out for an extended time period, preferably at least for several minutes or over a driving cycle. The diagnosis of the intactness of the hose and its linkage to the pressure sensors 1a, 1b can be accelerated in that waste heat occurring in the operation of the vehicle is utilized for a comparatively fast temperature-caused change of the internal pressure. This can optionally take place by the integration of the device, i.e. of the hose in the bumper in such a manner that the latter is arranged in the proximity of a waste-heat-generating component. Optionally, by way of ducts provided in the bumper, heated air can be guided to the hose. This approach has the result that, after every start of the vehicle, a temperature change of the filling medium is caused within a relatively short time, which results in a change of the internal pressure in the hose that is detected by the two pressure sensors 1a, 1b. When such a change of the internal pressure cannot be determined, the hose or the connections to the pressure sensors 1a, 1b are not tight. Pressure changes as a result of changes of height, for example, driving over mountain pass, can also be evaluated.

An operable device can, for example, be inferred when the pressure curve of the internal pressure is analyzed and a predefined pressure change in the pressure curve is determined within a predefined time period from a starting point in time, for example, the starting of the engine. As an alternative, a pressure difference of the internal pressure between a starting point in time and a measuring point in time can be determined, in which case the device will be considered to be operable when the pressure difference exceeds a predefined threshold value. In this case, it is sufficient for the threshold value to amount to only a few mbar.

As a result of the fact that no pressure compensation element has to be provided in the device, the device can be provided at lower cost. As a result of the fact that damage to the hose, for example, because of a tear or a marten bite, can be detected, no special measures will be necessary for protecting the hose. This also lowers the costs, especially for the mounting.

As a result of the fact that now all components of the device can be checked for plausibility, a plausibility check can also take place of the pressure signals supplied by the two pressure sensors with respect to one another. In the case of an intact system, basically both pressure sensors have to supply an identical signal, which is recognized by the electronic control unit in a time-delayed manner, possibly depending on the location of the force effect. However, now the signals supplied by the two pressure sensors can be linked with one another for increasing the functional reliability. This means that only when both pressure sensors transmit a corresponding signal to the electronic control unit will a triggering of a protection device for the pedestrian take place, which protection device is not shown in the FIGURE. As an alternative, the device can be operated such that only the signal of one of the two pressure sensors is used for triggering the protection device. As a result, a triggering of the protection device can take place within a shorter time period. The signal supplied by the second pressure sensor can be used only for redundancy purposes. Or the "impact location" can be localized by the difference in the propagation time.

As a result of the fact that particularly temperature-caused pressure changes are analyzed, a faster diagnosis of the hose and its linkage to the pressure sensors can take place than when, for example, the analysis of barometric height differences takes place. As required, it may be necessary that the previously-used pressure sensors be equipped with an enlarged measuring range. While, in the prior art, measuring ranges of ±20 mbar are normally used, it may be provided according to the invention that the measuring range be expanded to up to ±100 mbar. This takes into account the greater required dynamics.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for detecting the impact of an object on a vehicle, comprising:
    a hose filled with a filling medium, wherein the hose has a first end and a second end situated opposite the first end;
    a first pressure sensor connected with the first end of the hose, and a second pressure sensor connected with the second end of the hose, wherein the first and the second pressure sensors each provide a signal representing an internal pressure of the filling medium in the hose, including temperature-caused changes to the internal pressure during vehicle operation;
    an electronic control unit connected by way of connection lines with the first and the second pressure sensor for the exchange of data, wherein the electronic control unit is configured to process the signals received from the first and the second pressure sensor,
    wherein the hose is sealed off with respect to the environment and the first and the second pressure sensors such that the internal pressure of the filling medium in the hose is independent of an ambient pressure and thereby fluctuates depending on temperature, and
    wherein the electronic control unit is configured to process the sensor detected temperature-caused changes to the internal pressure during vehicle operation as a criterion for a diagnosis of operability of the device.

2. The device according to claim 1, wherein the first and the second pressure sensors comprise no pressure compensation element.

3. The device according to claim 1, wherein the first and the second pressure sensors comprise no ventilation openings or existing ventilation openings of the pressure sensors are closed in an airtight fashion.

4. The device according to claim 1, wherein the diagnosis of the operability of the device comprises a processing of the internal pressure for at least several minutes and/or a driving cycle.

5. The device according to claim 1, wherein the electronic control unit is configured to analyze a pressure curve of the internal pressure for diagnosing the operability of the device, wherein the device is determined to be operable when, within a predefined time period since a starting point in time, a predefined pressure change is determined in the pressure curve.

6. The device according to claim 1, wherein the electronic control unit is configured to determine, for the diagnosis of operability of the device, a pressure difference of the internal pressure between a starting point in time and a measuring point in time, wherein the device is determined to be operable when the pressure difference exceeds a predefined threshold value for a predefined time period and/or a driving cycle.

7. The device according to claim 5, wherein the electronic control unit is configured to determine, for the diagnosis of operability of the device, a pressure difference of the internal pressure between a starting point in time and a measuring point in time, wherein the device is determined to be operable when the pressure difference exceeds a predefined threshold value for a predefined time period and/or a driving cycle.

8. The device according to claim 1, wherein the device is arranged in a bumper of the vehicle adjacent to a heat source of the vehicle, and wherein the device is configured to generate, during operation of the vehicle and within a predefined time period, a temperature-caused, internal-pressure change of the filling medium in the hose.

9. The device according to claim 5, wherein the device is arranged in a bumper of the vehicle adjacent to a heat source of the vehicle, and wherein the device is configured to generate, during operation of the vehicle and within a predefined time period, a temperature-caused, internal-pressure change of the filling medium in the hose.

10. The device according to claim 7, wherein the device is arranged in a bumper of the vehicle adjacent to a heat source of the vehicle, and wherein the device is configured to generate, during operation of the vehicle and within a predefined time period, a temperature-caused, internal-pressure change of the filling medium in the hose.

11. The device according to claim 1, wherein the first and the second pressure sensors each has a measuring range of more than ±20 mbar.

12. The device according to claim 11, wherein the first and the second pressure sensors each has a measuring range of more than ±50 mbar.

13. The device according to claim 12, wherein the first and the second pressure sensors each has a measuring range of more than ±100 mbar.

14. The device according to claim 11, wherein the measuring range is selected as a function of at least one of a volume and a type of filling medium provided in the hose.

15. The device according to claim 12, wherein the measuring range is selected as a function of at least one of a volume and a type of filling medium provided in the hose.

16. The device according to claim 13, wherein the measuring range is selected as a function of at least one of a volume and a type of filling medium provided in the hose.

* * * * *